US 8,687,807 B2

(12) United States Patent  (10) Patent No.: US 8,687,807 B2
Duval et al.  (45) Date of Patent: Apr. 1, 2014

(54) CASCADING DYNAMIC CRYPTO PERIODS

(75) Inventors: Gregory Duval, Highlands Ranch, CO (US); Henri Kudelski, Chexbres (CH)

(73) Assignee: Nagrastar, L.L.C., Englewood, CO (US)

( * ) Notice: Subject to any disclaimer, the term of this patent is extended or adjusted under 35 U.S.C. 154(b) by 328 days.

(21) Appl. No.: 13/014,654

(22) Filed: Jan. 26, 2011

(65) Prior Publication Data

US 2012/0189121 A1  Jul. 26, 2012

(51) Int. Cl.
*H04K 1/00*  (2006.01)

(52) U.S. Cl.
USPC ............... 380/255; 380/210; 380/268; 726/2; 726/26

(58) Field of Classification Search
None
See application file for complete search history.

(56) References Cited

U.S. PATENT DOCUMENTS

| | | | |
|---|---|---|---|
| 6,424,714 B1 | 7/2002 | Wasilewski et al. | |
| 6,424,717 B1 | 7/2002 | Pinder et al. | |
| 7,116,892 B2 | 10/2006 | Wajs | |
| 7,302,058 B2 | 11/2007 | Candelore | |
| 7,333,610 B2 | 2/2008 | Dallard et al. | |
| 7,386,128 B2 * | 6/2008 | Moroney | 380/210 |
| 7,386,869 B1 | 6/2008 | Bastien et al. | |
| 7,397,918 B2 | 7/2008 | Patinkin et al. | |
| 7,681,227 B2 | 3/2010 | Zwart et al. | |
| 8,205,243 B2 * | 6/2012 | Wasilewski | 726/2 |
| 2003/0091188 A1 * | 5/2003 | Patinkin et al. | 380/210 |
| 2003/0188154 A1 | 10/2003 | Dallard et al. | |
| 2003/0206631 A1 | 11/2003 | Candelore | |
| 2004/0243803 A1 | 12/2004 | Codet et al. | |
| 2005/0039212 A1 | 2/2005 | Baran et al. | |
| 2005/0108763 A1 | 5/2005 | Baran et al. | |
| 2005/0198679 A1 | 9/2005 | Baran et al. | |
| 2005/0198680 A1 | 9/2005 | Baran et al. | |
| 2005/0238170 A1 * | 10/2005 | Ksontini et al. | 380/268 |
| 2005/0262537 A1 | 11/2005 | Baran et al. | |
| 2006/0041903 A1 | 2/2006 | Kahn et al. | |
| 2007/0100768 A1 | 5/2007 | Boccon-Gibod | |
| 2007/0258583 A1 | 11/2007 | Wajs | |

(Continued)

FOREIGN PATENT DOCUMENTS

WO  2006-114760  11/2006
WO  2008-012488  1/2008

OTHER PUBLICATIONS

PCT International Search Report and Written Opinion mailed Dec. 19, 2011, 8 pgs.

*Primary Examiner* — Lisa Lewis
*Assistant Examiner* — Henry Tsang
(74) *Attorney, Agent, or Firm* — Merchant & Gould P.C.

(57) ABSTRACT

Systems and methods for performing cascading dynamic crypto periods are disclosed. In embodiments, a control word and a set of functions is transmitted between a head-end and recipient devices at the beginning of a crypto period. The crypto period is divided into a discrete number of sub-crypto periods. The control word used to encrypt and decrypt the broadcast content is changed during each sub-crypto period. At the end of the first sub-crypto period, a derived control word is generated by passing the original control word to a function in the set of functions in order to generate a derived control word at the first transition between sub-crypto periods. The derived control word is used for encryption and decryption of the broadcasted content during the second sub-crypto period. Upon transitioning to the third sub-control-period, the derived control word is input into another function to produce a second derived control word.

66 Claims, 8 Drawing Sheets

(56) References Cited

U.S. PATENT DOCUMENTS

| | | |
|---|---|---|
| 2008/0065548 A1 | 3/2008 | Muijen et al. |
| 2008/0137848 A1 | 6/2008 | Kocher et al. |
| 2008/0192927 A1* | 8/2008 | Stransky .................... 380/42 |
| 2008/0317246 A1* | 12/2008 | Manders et al. ............ 380/37 |
| 2009/0028331 A1* | 1/2009 | Millar et al. ............... 380/255 |
| 2009/0080648 A1 | 3/2009 | Pinder |
| 2009/0254996 A1* | 10/2009 | Conus et al. .................... 726/27 |
| 2009/0323949 A1 | 12/2009 | Chieze et al. |
| 2010/0011397 A1 | 1/2010 | Baran et al. |
| 2010/0067703 A1 | 3/2010 | Candelore |
| 2010/0241753 A1* | 9/2010 | Garbajs et al. ............... 709/227 |
| 2011/0311044 A1* | 12/2011 | Westerveld et al. .......... 380/210 |

* cited by examiner

CASCADING DYNAMIC CRYPTO PERIODS

BACKGROUND

Digital Video Broadcasting (DVB) is an internationally recognized standard for transmitting digital television over cable, satellite, and other transmission mediums. A weakness of the DVB architecture is that the eight-byte control word used to encode a television transmission during a given crypto period is easily descrambled and shared over the Internet allowing non-subscribers access to television broadcasts. A simple answer to the vulnerabilities with the control word architecture is to shorten the crypto period such that there is not enough time for the control word to be descrambled and shared with non-subscribers. However, making such changes to the crypto period is not well supported by set-top-boxes for many reasons. It is with respect to this general environment that embodiments of the present disclosure have been contemplated.

SUMMARY

Embodiments of the present disclosure relate to systems and methods to perform cascading dynamic crypto periods in a DVB system or other data transmission systems. In embodiments, a key, or control word, may be used as a seed value and input into a set of functions that is resident on both a transmitting device (e.g., a head-end) and a receiving device. The initial key is input into a first function in the set of functions on both the transmitting device and the receiving device such that both devices separately generate an identical derived key. The transmitting device uses the derived key to encrypt a data transmission, which is then decrypted by the recipient device using the same derived key. The derived key on each device is then input into a second function in the set of functions resulting in a second derived key. This second key is then used for encryption and decryption. This process may be repeated until all of the functions in the set of functions resident on the transmitting and receiving device have been used. When the set of functions is exhausted, a new set of functions and a new key seed value is shared between the devices and the process repeats.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
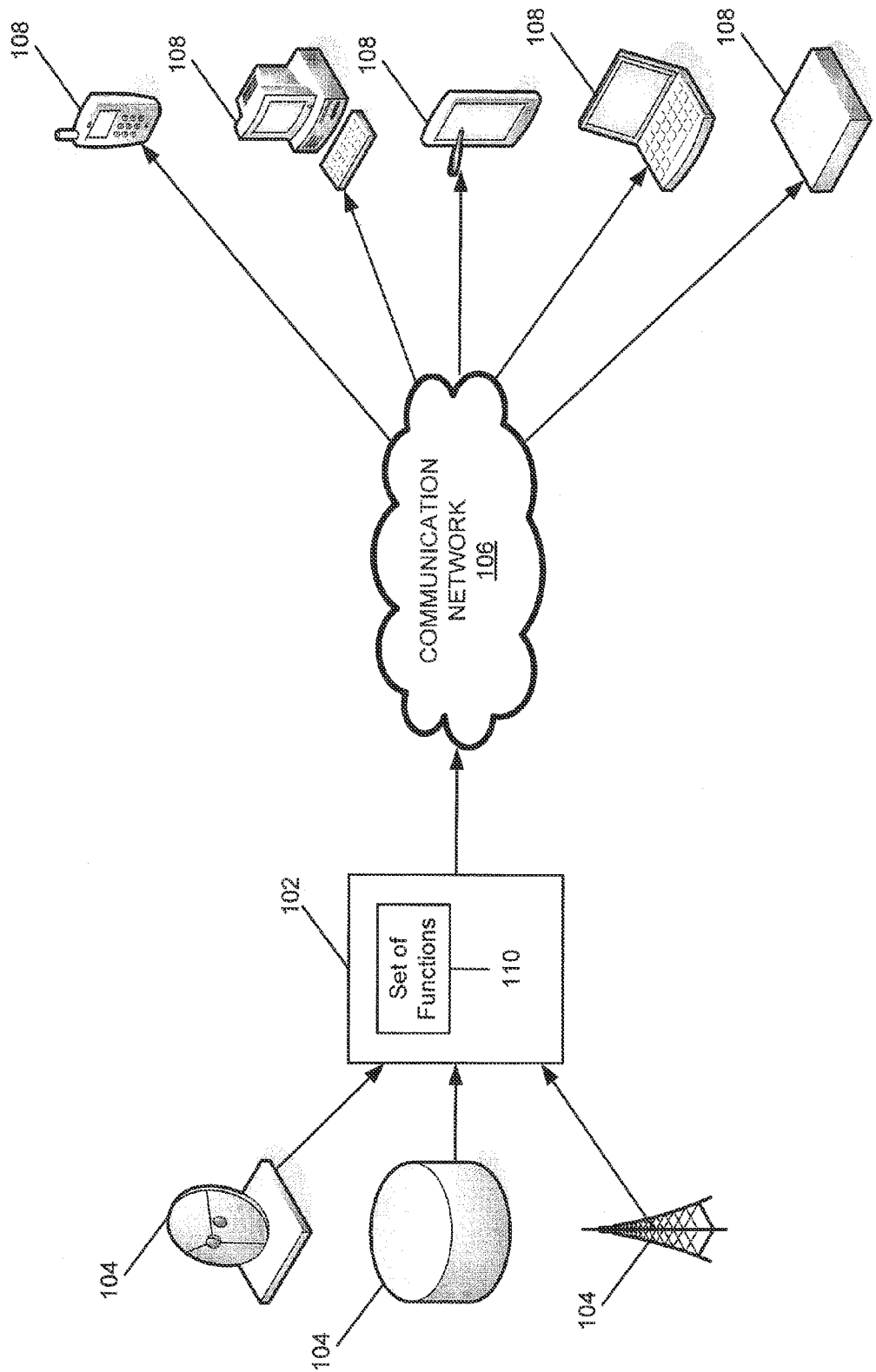
FIG. 1 illustrates an embodiment of a communications system 100 that performs cascading dynamic crypto periods.

The various embodiments described herein generally provide systems and methods for protecting streamed content using cascading dynamic crypto periods. In embodiments, the systems and methods disclosed herein may be practiced in a Digital Video Broadcasting (DVB) compliant system. DVB is a set of internationally accepted open standards for broadcasting digital television. The DVB standards define both the physical layer and the data link layer of a distributed system. There are DVB standards defining the distribution of content over various different mediums. For example, satellite transmissions are defined in the DVB-S, DVB-S2, and DVB-SH specifications. Cable transmission is defined in the DVB-C and DVB-C2 specifications. Terrestrial television transmission is defined in the DVB-T and DVB-T2 specifications for standard television formats and DVB-H and DVB-H2 for the transmission of mobile television, e.g., television for handheld devices such as mobile phones. Microwave transmission is defined in the DVB-MT, DVB-MC, and DVB-MS standards.

In addition to defining the physical and data link layers, the DVB suite includes three standards that are used to provide conditional access protection of the transmitted content. These standards include the DVB-CA, DVB-CSA, and DVB-CI standards. Conditional access is a method of protecting content by requiring a device to meet certain criteria before it accesses content. Conditional access plays an important role in ensuring that broadcasted content is made available only to subscribers of a particular broadcast system (e.g., cable and satellite customers, etc). The general DVB architecture uses a global key, called a control word (CW), to perform conditional access. The CW is used to encrypt data before it is broadcast to subscribers. The CW is transmitted by a head-end (e.g., a satellite or cable provider) to subscriber devices in an entitlement control message (ECM). The ECM is generally encrypted before transmission to the subscriber device. The conditional access system of the subscriber devices (e.g., a smart card or other conditional access module whether in hardware or software) decrypts the ECM using information received in an entitlement management message (EMM) transmitted from the head-end. The subscriber device can then use the CW to decrypt the content broadcasted by the head-end. Generally, a CW is used for a certain period of time, or a crypto period. Upon expiration of a crypto period a new crypto period begins. The head-end may then transmit a new CW to it subscriber devices and proceeds to use the new CW to encrypt the broadcasted content.

One of the main weaknesses of the DVB conditional access architecture is that a CW can be decrypted and easily shared over the Internet. Generally, the CW consists of eight-bytes. The duration of a crypto period usually varies between five to sixty seconds. Thus, all it takes for a non-subscriber to defeat the DVB conditional access architecture is the discovery of the eight-byte CW, a task which may be accomplished within the duration of a typical crypto period.

A solution to this weakness is to decrease the time of each crypto period. However, such a change is not easily supported by recipient devices due to the other requirements and processing the recipient device must perform (e.g., channel changes, video buffering, etc). Embodiments of the present disclosure relate to systems and methods that can be employed to solve the conditional access issues in the DVB architecture despite the limitations present in recipient devices.

In embodiments, a key, or control word, may be used as a seed value and input into a set of functions that is resident on both a transmitting device (e.g., a head-end) and a receiving device. The initial key is input into a first function in the set of functions on both the transmitting device and the receiving device such that both devices separately generate an identical derived key. The transmitting device uses the derived key to encrypt a data transmission, which is then decrypted by the recipient device using the same derived key. The derived key on each device is then input into a second function in the set of functions resulting in a second derived key. This second key is then used for encryption and decryption. This process may be repeated until all or substantially all of the functions in the set of functions resident on the transmitting and/or receiving device have been used. When the set of functions is exhausted, a new set of functions and a new key seed value is shared between the devices and the process repeats.

As will become evident throughout this disclosure, the separate derivation of identical keys on both the transmitting and receiving devices allows for the division of a crypto period of an encrypted data transmission stream into smaller sub-crypto periods in which the data transmission stream is encrypted using different key values without having to actually exchange each key value. In such a system, even if a non-participating actor is able to intercept and decrypt the initial key value, the duration of the initial key's use is significantly shortened before the transmitting and receiving devices transition to using the derived keys. Because the non-participating member does not have access to the set of functions, it will not be able to generate the derived keys on its own, thus limiting the unauthorized access of the data transmission stream.

While the present disclosure describes cascading dynamic crypto periods as a solution to the shortcomings of DVB conditional access, one of skill in the art will appreciate that the methods and systems disclosed herein can be practiced to protect content in other types of data transmission streaming and/or broadcasting that is not compliant with the DVB architecture such as, but not limited to, streaming media over the Internet. The systems and methods for performing cascading dynamic crypto periods will now be discussed in detail with respect to the accompanying figures.

FIG. 1 illustrates a communications system 100 that performs cascading dynamic crypto periods. The communications system includes a head-end device 102 that receives content from content providers 104 and distributes the content across a communication network 106 to various recipient devices 108. The recipient devices can access the content and display it to a user. A recipient device 108 can be any device capable of receiving and decoding a data transmission stream over communication network 106. Such devices include, but are not limited to, mobile phones, smart phones, personal digital assistants (PDAs), satellite or cable set-top-boxes, desktop computers, laptop computers, tablet computers, televisions, radios, or any other device known to the art.

In embodiments, the head-end 102 may be the distribution point of a cable television provider, the distribution of point of a satellite television provider (e.g., a satellite), or a server broadcasting content over the Internet. One of skill in the art will appreciate that the head-end 102 may be any type of device, or a collection of devices (as the case may be), that are capable of receiving, encrypting, and broadcasting content over a network.

In one embodiment, the content broadcast over communications system 100 may be generated by the head-end device 102. In other embodiments, the head-end device may receive content from one or more content providers 104. In such embodiments, the head-end device 102 is in electrical communication with one or more content providers 104. For example, a content provider may be a cable, terrestrial, or satellite television station that transmits content to the head-end device 102 over a wired (e.g., cable, fiber optic, or Internet connection) or wireless connection (e.g., via radio, microwave, or satellite communications). In other embodiments, the content may reside in a datastore that is in electrical communication with the head-end 102. While FIG. 1 depicts the content providers 104 as being separate entities from the head-end 102, in other embodiments, the content providers 104 and head-end device 102 may be a single entity.

The head-end 102 is tasked with distributing the content over a network 106 to various recipient devices 108. In embodiments, the communication network 106 may be the Internet, a cable network, a fiber optic network, a satellite communications network, a terrestrial broadcasting network (e.g., networks communicating over radio or microwave transmission mediums), a cellular data network, a wide area network (WAN), a local area network (LAN), a cellular data network, a plain old telephone service (POTS) network, or any other type of communication network capable of streaming and/or broadcasting data transmissions between various devices. One of skill in the art will appreciate that the systems and methods disclosed herein can be practiced regardless of the type of communication network used to transmit data between devices. In many cases, the head-end 102 will broadcast the content in a data transmission stream over the communications network rather than sending content to a particular device. Because the content is being broadcast over the communication network 106, the transmission can be received by any number of devices capable of interacting with the communication network 106. In order to prevent non-authorized users from accessing the broadcasted data transmission stream, the head-end 102 encrypts the data transmission stream before it is broadcast over the communication network 106. Although not illustrated in FIG. 1 the communication network may also be used to perform two-way communication between the head-end 102 and the recipient devices 108.

In embodiments, the data transmission stream is encrypted using a key. The key is used to encrypt the data transmission stream for a certain amount of time (e.g., a crypto period). Upon expiration of the crypto period, a new key is used to encrypt the data transmission stream. The new key is shared between head-end 102 and the various recipient devices 108. In one embodiment, communication system 100 may operate according to the DVB architecture. In such embodiments, the control word (CW) acts as the key used in encrypting the stream. As discussed, the head-end 102 periodically transmits the CW to the various subscriber devices using an ECM message. Additionally, the head-end 102 transmits an EMM message to the various subscribers which contains information necessary to decrypt the ECM and retrieve the CW. However, these messages can be intercepted and decoded by a non-subscriber resulting in unauthorized access to the broadcast data transmission stream for the duration of the crypto period corresponding to the intercepted CW. However, communication system 100 can shorten the duration of the CW crypto period and thus reducing unauthorized access to content by non-subscribers through the use of cascading dynamic crypto periods by the head-end 102 and recipient devices 108. In embodiments, the head-end 102 uses a set of functions 110 to derive a series of new control words. The set of functions 102 is initially transmitted from the head-end 102 to the recipient devices 108. As will be described in further detail with respect to FIGS. 2 and 3, both the head-end 102 and the recipient devices 108 use the set of functions 110 to generate a series of control words that are used to encrypt and decrypt broadcasted data stream transmissions.

Figure 2:
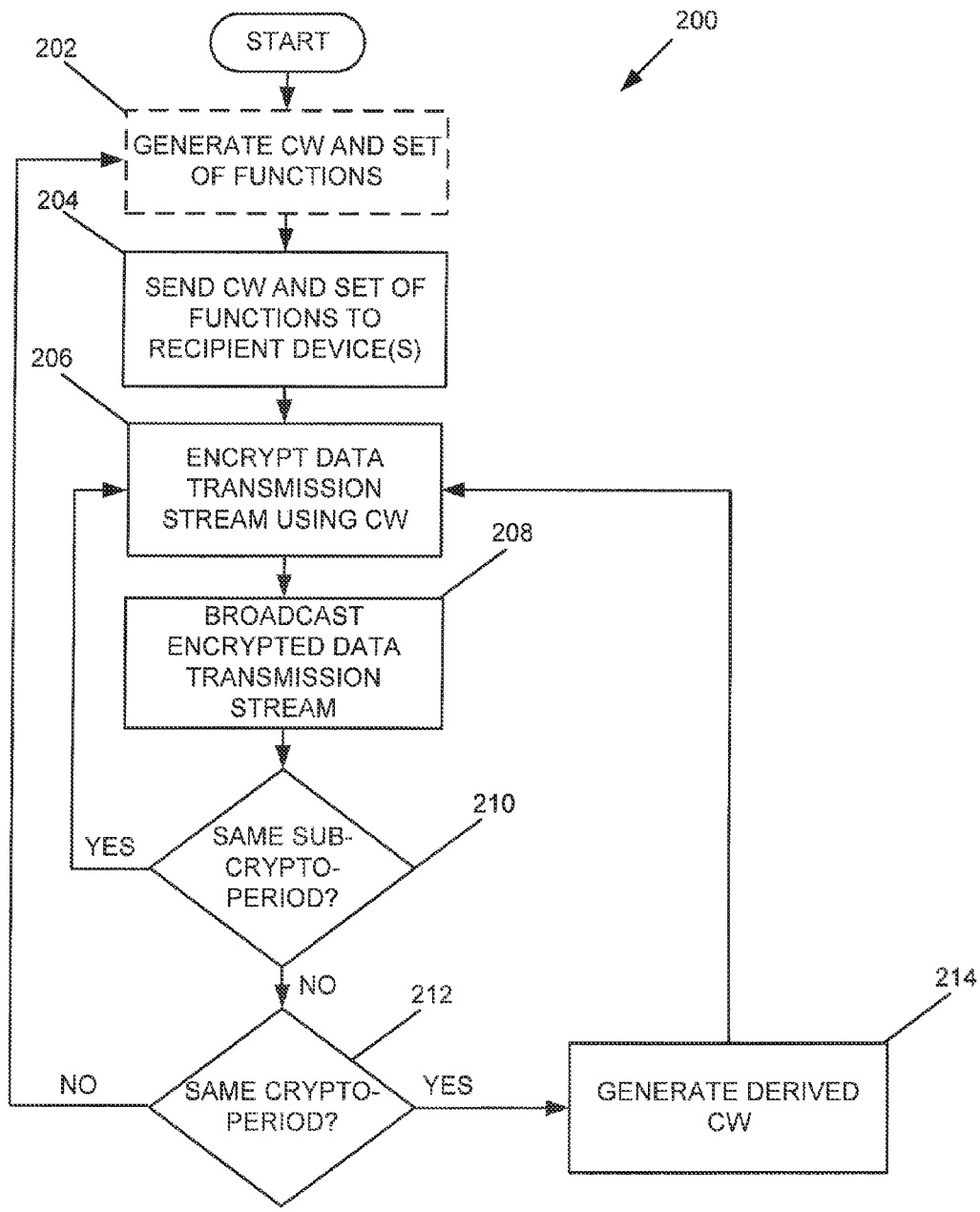
FIG. 2 is a flow chart illustrating an embodiment of a method 200 for performing cascading dynamic crypto periods at a head-end device.

FIG. 2 is a flowchart representing an embodiment of a method 200 of performing cascading dynamic crypto periods at a head-end, such as head-end device 102 (FIG. 1). Flow begins at optional step 202. At step 202, the head-end generates an initial control word (e.g., a key) for a crypto period and a set of functions for the crypto period. This step is optional because the initial control word and the set functions may be generated by another device and provided to the head-end. In embodiments, the control word may be any type of key used in an encryption process. In an embodiment related to the DVB architecture, the initial control word may be the eight-byte control word defined by the DVB specification or any other type DVB-compliant control word.

In embodiments, the set of functions are deterministic functions, that is, given the same input, the functions will always produce the same output. Because the functions are used by both the head-end and any recipient device to generate identical derived control words, it is necessary that the functions produce the same results on each device. In embodiments, the set of functions contains at least one function. As will be discussed in more detail with respect to operation 210, the number of functions included in the set may have a direct effect on the duration and number of sub-crypto periods that are created by cascading dynamic crypto periods. For example, a greater number of functions included in the set of functions will result in a larger number of sub-crypto periods dividing each crypto period, which in turn result in shorter sub-crypto periods.

In one embodiment, the set of functions are generated manually and inputted into the head-end device. In another embodiment, the set of functions may be derived by a computer, residing at the head-end device or elsewhere. In such embodiments, the functions may be derived from a root function.

After optional step 202, flow proceeds to operation 204 and the initial control word and the set of functions either generated by or received at the head-end device are sent to one or more recipient devices. For example, referring again to FIG. 1, the head-end device 104 may transmit the control word and the set of functions to recipient devices 108 via communication network 106. In embodiments, the control word and the set of functions may be sent to the recipient devices separately or in the same message. In another embodiment, e.g., in which the head-end device is a part of the DVB architecture, the control word may be sent to the recipient devices in an ECM message and the set of functions may be sent in an EMM message. In other embodiments, the control word and set of functions can be sent to the recipient devices in any type of message or data transmission.

As will be described below, the control word sent at operation 204 will be the initial control word for a crypto period. This control word will act as the seed which will be used to generate the first derived control word for the first sub-crypto period. The set of functions will be used by both the head-end device and the recipient device to generate a series of derived control words corresponding to each dynamic sub-crypto period of the data stream transmission.

Flow then proceeds to operation 206 where the head-end encrypts the data transmission stream using the current control word. In embodiments, if it is the beginning of the crypto period, the initial control word may be used to encrypt the data transmission. This occurs when operation 206 is reached from operation 204. In other embodiments, for example, when operation 206 is reached from operation 214 a derived control word is used to encrypt the data transmission stream. In embodiments, the data transmission stream may comprise content, such as a television broadcast, a radio broadcast, streamed media over the Internet, voice data, or any other type of media. One of skill in the art will appreciate that the method 200 described in FIG. 2 may operate on any type of streaming or broadcast content.

Similarly, one of skill in the art will recognize that any type of encryption algorithm may be employed to encrypt the data transmission at operation 206. In one embodiment, the encryption algorithm makes use of a key, such as a control word, for encryption and decryption purposes. In other embodiments, other types of encryption algorithms may be practiced with the method 200 to produce an encrypted data transmission stream.

Flow proceeds to operation 208 where the encrypted data transmission stream is broadcast to one or more recipient devices. In one embodiment, a head-end broadcasts the encrypted data transmission stream over a network, such as communication network 106 described in FIG. 1. The network may be the Internet, a cable network, a fiber optic network, a satellite communications network, a terrestrial broadcasting network (e.g., television and radio broadcasting), a cellular data network, a wide area network (WAN), a local area network (LAN), a plain old telephone service (POTS) network, or any other type of communication network capable of streaming and/or broadcasting data transmissions between various devices. Embodiments disclosed herein may be practiced regardless of the communication medium used by any underlying network or networks used to transmit the encrypted data transmission stream at operation 208. As an example, the underlying network or networks used transmit the encrypted data transmission stream may be utilized by cellular, radio, satellite, infrared, electrical signals, light, and/or microwave communication mediums and/or networks.

Flow proceeds to operation 210 where a decision is made as to whether the method 200 is still operating in the same sub-crypto period. A sub-crypto period is a discrete portion of a crypto period. The crypto period is the time period between the transmission of control words from the head-end device to recipient devices. A sub-crypto period is created by dividing the crypto period into a number of discreet sub-crypto periods. The number of sub-crypto periods depends upon the number of derived control words that are generated during practice of the method 200. For example, if five derived control words are generated, there will be five sub-crypto periods. In another embodiment, if the first control word is used to encrypt the first sub-crypto period and there are a total of N sub-crypto periods, then N−1 derived control words will be generated. In yet another example, if the original control word is used for a sub-crypto period and there a five derived control words, there may be six total sub-crypto periods. In further embodiments, the number of sub-crypto periods may be determined by the number of functions transmitted, for example, in an EMM as described with respect to operation 204. In yet another embodiment, the number of sub-crypto periods may be based off of a specified duration for each sub-crypto period. For example, each sub-crypto period may be defined as lasting for 3 seconds. If the crypto period lasts 1 minute, then there would be 20 sub-crypto periods.

In embodiments, each sub-crypto period uses a different key (e.g., a universally unique control word or, in embodiments, a control word that is different from the previously used control word) to encrypt the encrypted data transmission stream. In embodiments, a control word is transmitted from the head-end to recipient devices at the start of each crypto period. Thus, in one embodiment a derived key or derived control word must be generated for every sub-crypto period. In another embodiment, a derived key or derived control word must be generated for every sub-crypto period except the first sub-crypto period (which may use the original control word or key distributed by the head-end. The derived keys and/or derived control words are independently generated on the head-end and the recipient device, thereby resulting in a shorter period in which a non-authorized user who intercepted the original control word or key has accessed to the broadcasted content. Thus, the use of the independently derived keys and/or derived control words provides greater security to a broadcast system in general, but particularly for a broadcast system employing the DVB architecture.

In one embodiment, a determination as to whether the method 200 is operating in the same sub-crypto period is based off of time. For example, in such an embodiment each sub-crypto period may last for a specific amount of time. In such embodiments, a timer is maintained by the device performing the method 200. Upon reaching the specified time, the method 200 transitions into the next sub-crypto period and resets the timer. In another embodiment, the determination may be based off of the presence of an indicator. The indicator may be present in the clear data transmission stream or in the resulting encrypted data transmission stream. Although not shown in FIG. 2, the method 200 generates or accesses a clear data transmission stream before the method 200 produces an encrypted data transmission stream at operation 206. The clear data transmission stream includes content, such as multimedia content (e.g., video, audio, and text content). For example, in one embodiment the clear data stream may be an MPEG stream. In embodiments, the clear data transmission stream may also include a flag that indicates a transition between sub-crypto periods. In one embodiment, the flag may be included in metadata that is part of the clear data transmission stream. In such an embodiment, upon detecting the flag a device practicing the method begins the transition to the next sub-crypto period. In other embodiments, the flag may be included in portions of the clear data transmission stream other than the metadata. The presence of this flag in the clear data transmission stream can indicate a transition into a new sub-crypto period. In yet another embodiment, the flag may be placed in the encrypted data transmission stream, for example, at operation 206. In another embodiment, the transition may be indicated by a bit of data in the clear or encrypted data transmission stream. One of skill in the art will appreciate that many types of indicators or indication mechanisms may be employed with method 200 at operation 210.

If method 200 is operating in the same sub-crypto period, no changes are necessary and flow branches "YES" and flow returns to operation 206 where the clear data transmission stream is encrypted using the same key and/or control word or derived key and/or control word that was in use prior to reaching operation 210. If the sub-crypto period has changed, flow branches "NO" to operation 212. At operation 212 yet another determination is made as to whether the method 200 is operating in the same crypto period. In embodiments, the determination at operation 212 can be performed using the same mechanisms as discussed with respect to operation 210 (e.g., a timer, an indicator, a flag, etc). In embodiments, a separate mechanism may be employed at operation 212 than the mechanism used at operation 210. For example, a separate timer or separate flag may be used. In another embodiment, the same type of indicator or indicators may be employed in operation 210 and 212. Furthermore, while operation 210 and 212 are illustrated as separate and distinct operations in FIG. 2, one of skill in the art will appreciate that both determinations may be accomplished in a single operation via a single mechanism and, thus, the separate operations 210 and 212 are not limiting factors as to the scope of method 200.

If a determination is made that the method 200 is no longer operating in the same crypto period, flow branches "NO" to optional operation 202 and a new crypto period begins (e.g., a second control word and second set of functions are optionally generated and transmitted to the recipient devices). Thus, a new set of functions and control word are generated 202, and the method restarts. One of skill in the art will appreciate that method 200 may be performed in a continuous loop in order to provide continuous protection of content during the broadcast of a data transmission stream.

If the method 200 is still operating in the same crypto period, flow branches "YES" to operation 214. At operation 214 a derived control word is generated. In embodiments, the derived control word is generated by inputting the previous control word into one of the functions in the set of functions optionally generated at operation 202. Various embodiments of generating a derived control word is described in more detail with respect to FIG. 4 and its corresponding discussion. The function is used to generate a derived control word or derived key. In one embodiment, after the function is used, the function may be discarded to ensure that the same function is used again. In another embodiment, method 200 may also maintain a list or a type indicator in order to keep track of which functions have been used and which function should be employed each time method 200 reaches operation 214. The selection of a function from the set of functions may also be based upon a function identifier that identifies the function. The function identifier may be transmitted in the clear data transmission stream, the encrypted data transmission stream, in the ECM, in the EMM, or in any other message or data transmission stream. After generating the derived control word, flow returns to operation 206, and the clear data transmission stream is encrypted using the newly derived control word from operation 214. Flow will continue to proceed from operation 206 as previously described, and the method 200 will continue to use the derived control word to encrypt the clear data transmission stream until the beginning of the next crypto period or the next sub-crypto period.

FIG. 2 illustrates an embodiment of a method 200 for encrypting a clear data transmission stream (e.g., an unencrypted data transmission stream) in order to broadcast an encrypted data transmission stream using cascading dynamic crypto periods. However, FIG. 2 represents just one embodiment of the present disclosure. In embodiments, the head-end may be a head-end device located at the head-end of a cable transmission, a satellite, a server, or any other head-end transmission device. In other embodiments, the method 200 may be performed by a device other than a head-end device such as, for example, a general computing device as described in FIG. 8. Additionally, in other embodiments, the steps of method 200 may be combined or performed in a different order without deviating from the spirit of the present disclosure.

Figure 3:
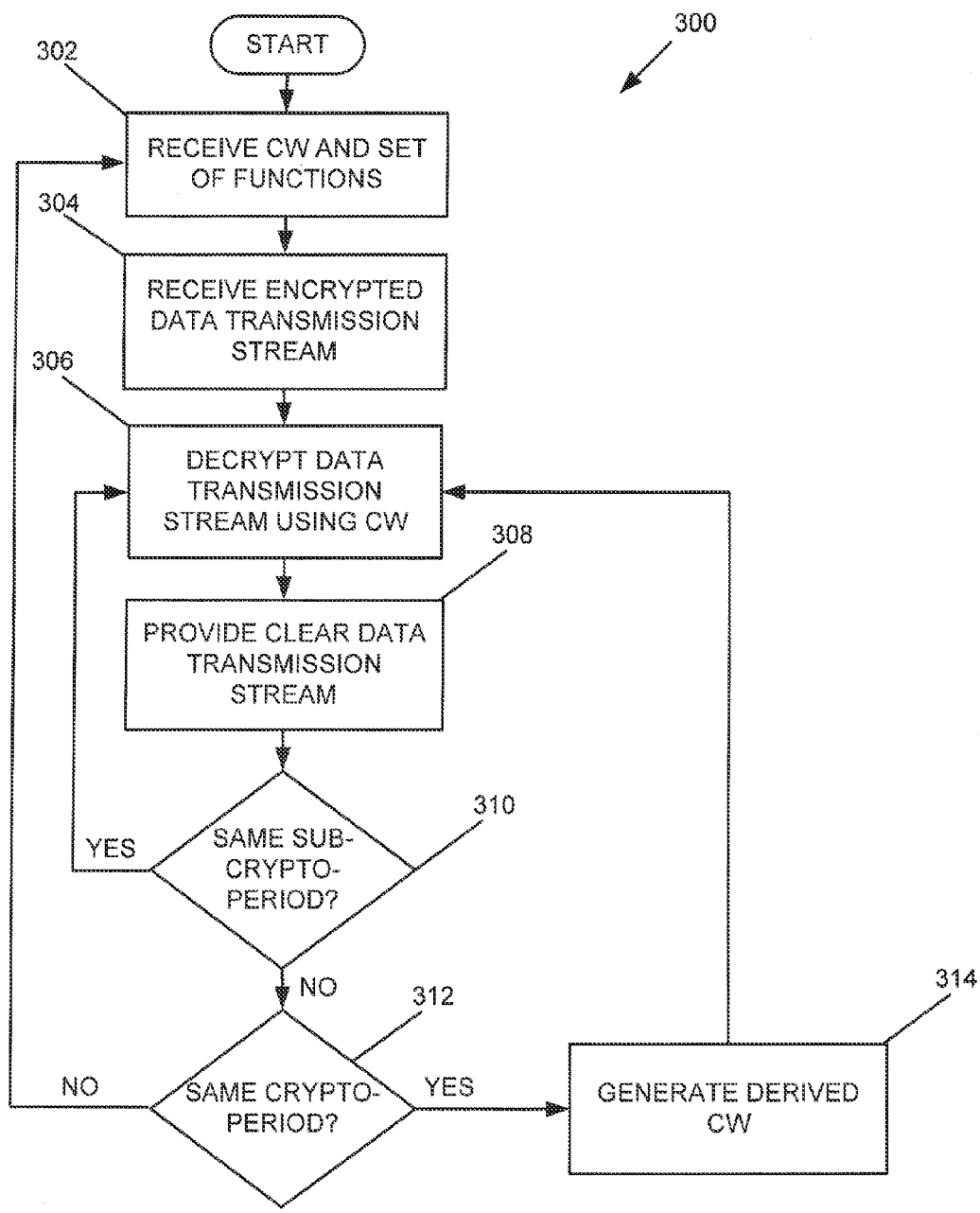
FIG. 3 is a flow chart illustrating an embodiment of a method 300 for performing cascading dynamic crypto periods at a recipient device.

FIG. 3 illustrates an embodiment of a method 300 for performing cascading dynamic crypto periods at a recipient device. Flow begins at operation 302 where the method 300 receives a control word and a set of functions. The control word may be used as a key to encrypt a portion of an encrypted data transmission stream. The control word may also be a seed value that will be used to generate derived control words using the functions in the set of functions. As previously discussed, the set of functions may include one or more deterministic functions. In embodiments, the control word and the functions received at operation 302 are the same as the control words transmitted in operation 204 (FIG. 2). In one embodiment, the control word received at operation 302 may be contained in an ECM. In another embodiment, the set of functions received at operation 302 may be contained in an EMM. In yet another embodiment, the control word and the set of functions may be contained in the same message. One of skill in the art will appreciate that the control word and the functions may be received in any type of message or data transmission.

In embodiments, the functions may be stored on the recipient device. In such embodiments, the functions may be stored in the conditional access system of the device, (e.g., a smart card or specific chip on the device). In embodiments, the functions may be identified by a function ID.

Flow continues to operation 304 where the method 300 receives an encrypted data transmission stream. The method 300 may receive the encrypted data transmission stream over a network, such as communications network 106 (FIG. 1). The encrypted data transmission stream may be a protected broadcast with access limited to specific parties. For example, the encrypted data transmission may be a cable, terrestrial, or satellite broadcast of content (e.g., audio, visual, and/or textual content). Access to the content contained in the encrypted data stream may be limited to specific parties, such as, but not limited to, subscribers of a particular cable, terrestrial, or satellite broadcast provider. A device practicing method 300 may be a subscriber device, that is, the device has access to the encrypted content.

Flow proceeds to operation 306 where the encrypted data transmission stream is decrypted by the method 300. As previously described with respect to FIG. 2, any type of encryption may be practiced with the embodiments disclosed herein. Similarly, any method of decryption may also be practice and employed at operation 306, so long as the decryption method requires the use of some kind of additional key or input in order to correctly decrypt the encrypted content. In one embodiment, upon initial entry to operation 306, the control word received at operation 302 may be used to decrypt the encrypted data transmission stream. In other embodiments, a derived key or derived control word may be used to decrypt the encrypted data transmission stream at operation 306.

Flow continues to operation 308 where method 300 provides the clear data transmission stream reproduced from the decryption of the encrypted data transmission stream at operation 308. In embodiments, the clear data transmission stream is the same as the clear data transmission stream encrypted at operation 206 of FIG. 2. In one embodiment, providing the clear data transmission stream may include transferring the clear data transmission stream to another device for processing. For example, if a set-top-box is practicing method 300 at operation 308 the set-top-box may transmit the clear data transmission stream to a television for display or to a storage device in order to store the clear data transmission stream for later use. In other embodiments, providing the clear data transmission stream may include other functionality such as, but not limited to, storing, displaying, transmitting, broadcasting, and/or modifying the clear data transmission stream. One of skill in the art will appreciate that the clear data transmission stream may be operated on in any manner at operation 308. In another embodiment, a clear data transmission stream may be further protected (e.g., by encryption or otherwise) prior to storage or communication over outputs. In such embodiments, the clear data transmission stream may be encrypted using the same form of encryption as was used to originally encrypt the encrypted transmission stream received at operation 304. In another embodiment, a different type of encryption algorithm or a different protection process altogether may be applied to the clear data transmission stream at operation 308.

Flow continues to operation 310 where the method 300 determines if it is still operating in the same sub-crypto period. In embodiments, the determination may be based off of the same factors as previously described with respect to operations 210 and 212 of FIG. 2. For example, the determination may be based off of a timer, an indicator, and/or a flag located in either the encrypted data stream or the clear data stream. For example, the flag may be included in a header, metadata, and/or any other portion of the clear or encrypted data transmission stream. Upon detecting the flag, the device practicing the method 300 begins a transition to the next sub-crypto period. If the method is operating in the same sub-crypto period, flow branches "YES" and returns to operation 306 and the method continues to decrypt the encrypted data transmission stream using the same control word or derived control word that it used upon entering operation 310.

If the sub-crypto period has changed, flow branches "NO" to operation 312. At operation 312 it is determined whether the method 300 is operating in the same crypto period. This determination may be made in the same manner as described with respect to operation 212 of FIG. 2. In embodiments, a separate mechanism may be employed at operation 312 than the mechanism used at operation 310 in order to make a determination. For example, a separate timer or separate flag may be used. In another embodiment, the same indicator or indicators may be employed in operation 310 and 312. Furthermore, while operation 310 and 312 are illustrated as separate and distinct operations in FIG. 3, one of skill in the art will appreciate that both determinations may be accomplished in a single operation via a single mechanism and, thus, the separate operations 310 and 312 are not limiting factors as to the scope of method 300.

If method 300 determines that a new crypto period has been reached, flow branches "NO" and returns to operation 302 at which point the method receives a new control word and set of functions and the method is repeated (e.g., a second control word and a second set of functions). If the crypto period has not changed, flow branches "YES" from operation 312 to operation 314. At operation 314 a derived control word is generated. For example, the derived control word may be generated using the current control word (e.g., the initial control word received at operation 302 or a previously derived control word). In embodiments, the current control word is input to one of the functions of the set of functions received at operation 302 in order to generate a new derived control word. Various embodiments of generating a derived control word is described in more detail with respect to FIG. 4 and its corresponding discussion. The function selection may be based off of a function identifier, a maintained list, a type indicator, etc as previously described with respect to FIG. 2. As described with respect to operation 214 (FIG. 2), method 300 may discard the function after use at operation 314. In another embodiment, the method 300 may maintain a list of used functions from the set of functions. In yet another embodiment, the method 300 may update a pointer to the next function that should be used. In further embodiments, the method 300 may employ any other mechanism to ensure that each function is used only when indicated and in the order defined by the set of functions.

In embodiments, because the set of functions shared between the head-end and the recipient, the method 300 will generate the same derived control words in the exact same order as the derived control words generated by the method 200. In embodiments, this is possible because each of the functions provided in the set functions shared between the head-end and the recipient are deterministic functions. Furthermore, in such embodiments both method 200 (practiced by the head-end) and method 300 (practiced by the recipient device) use the same initial seed value when generating the derived functions (e.g., the initial control word).

Flow returns to operation 306 and the encrypted data transmission stream is decrypted using the control word or key derived at operation 314. The method 300 continues from this point and the encrypted data transmission stream is decrypted using the derived control word until the crypto period ends, in which case a new control word and set of functions are received (e.g., a second control word and a second set of functions) and the method continues from operation 302, or until the sub-crypto period ends and a new control word is derived using the current derived control word when the method 300 returns to operation 314.

FIG. 3 illustrates an embodiment of a method 300 for decrypting an encrypted data transmission stream in order to process a clear data transmission stream of cascading dynamic crypto periods. However, FIG. 3 represents just one embodiment of the present disclosure. In embodiments, the recipient device may be a general set-top-box, a set-top-box with a smart card encoding conditional access instructions to perform the method 300, a computer (e.g., a laptop, tablet computer, or desktop computer), a smartphone, a cell phone, and/or a television. In other embodiments, the method 300 may be performed by any other device such as, for example, a general computing device as described in FIG. 8. Additionally, in other embodiments, the steps of method 200 may be combined or performed in a different order without deviating from the spirit of the present disclosure.

As shown in FIGS. 2 and 3, the initial control word and set of functions shared between a transmission device (e.g., the head-end) and the recipient devices allows for the device(s) to generate a series of identically derived control words over a period of time without having to share additional information. This allows the crypto period to be divided into a larger number of sub-crypto periods having different protection characteristics (e.g., by encrypting content using different key values) without having to communicate the key values between the transmission device and the recipient devices, thereby reducing the security threat posed by the interception of continuous key transmission. Thus, these dynamically cascading crypto periods provide additional security to the broadcast content.

Figure 4:
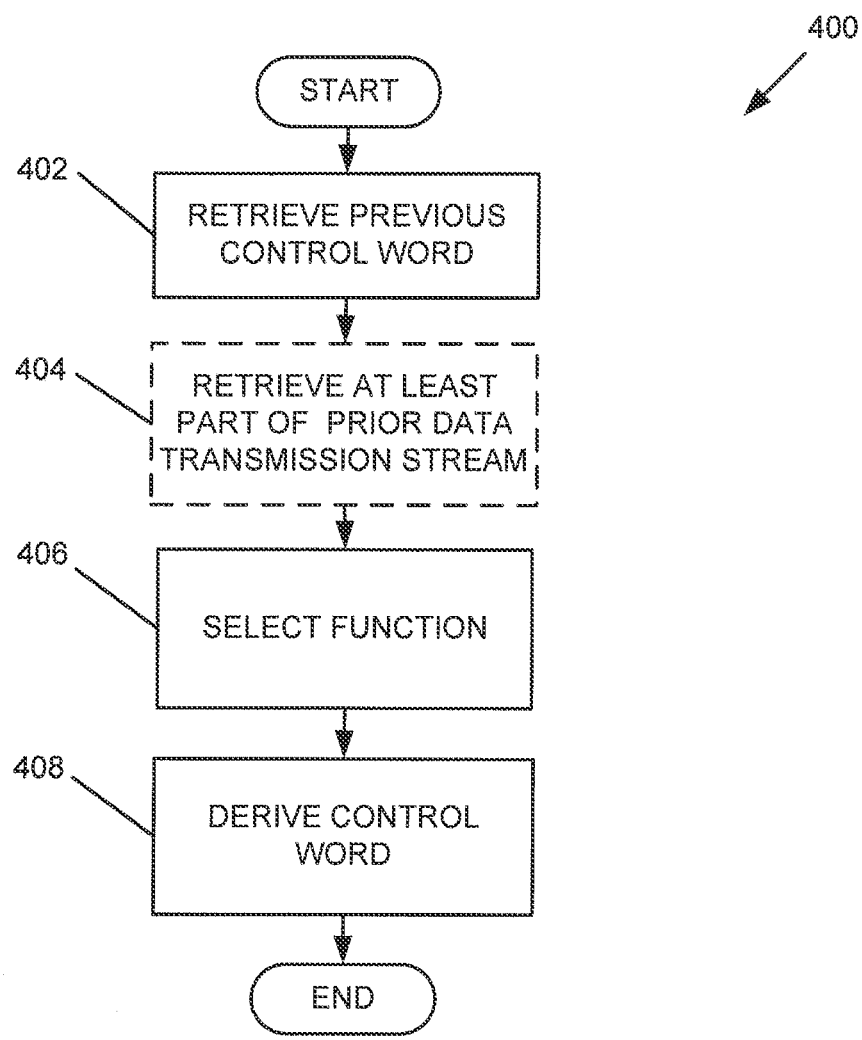
FIG. 4 is a flow chart illustrating an embodiment of a method 400 for deriving a control word.

FIG. 4 illustrates an embodiment of a method 400 for deriving a control word. The method 400 may be employed to generate a derived control word at operation 214 (FIG. 2) or operation 314 (FIG. 3). Flow begins at option 402 where the method 300 retrieves a previous control word. The previous control word may be an initial control word for a particular crypto period or it may be a derived control word from a previous sub-crypto period. In embodiments, the device and/or application performing the method 400 may already have stored or have access to the previous control word and it may not be necessary to receive a transmission that includes a control word at operation 402. In such an embodiment, step 402 of retrieving the previous control word may entail retrieving the previous control word from local memory and/or storage or otherwise accessing the previous control word. In such embodiments, the retrieved data (e.g., the previous control word) already resides in the local memory and/or local storage of the device performing the method 400. In another embodiment, the device and/or application performing the method 400 may receive a transmission that includes a control word at operation 402.

Flow continues to operational step 404. At operation 404 and at least part of the prior data transmission stream is retrieved. In embodiments, retrieval of the data may entail the storage of either the encrypted data transmission stream, the clear data transmission stream, or storing data from each data transmission stream in a manner such that the data is later accessible (e.g., the stored data can be accessed during a later crypto period or sub-crypto period). For example, some or all of the data from either the encrypted or the clear data stream may be stored locally by the device performing operation 400. In one embodiment, all of the data from the encrypted or the clear data transmission stream is stored. In another embodiment, only a particular portion of the encrypted or clear data transmission streams are stored. For example, only a particular header, a particular portion of metadata, or a particular portion of the data (e.g., audio data, video data, compression data, etc) may be stored such that it can be later retrieved at operation 404. Again, the device and/or application performing the method 400 may already have at least part of the data transmission stream already and it may not be necessary to actually retrieve this data at operation 404. In such an embodiment, the step 404 of retrieving the previous control word may entail retrieving the data from local memory and/or storage or otherwise accessing the previous control word. In such embodiments, the retrieved data (e.g., at least part of the prior data transmission stream) already resides in the local memory and/or local storage of the device performing the method 400.

Flow proceeds to operation 406 where a function is selected from a set of functions. For example, at operation 406 a particular function from the set of functions generated at operation 202 (FIG. 2) or received at operation 302 (FIG. 3) may be selected. As previously described, the function may be a deterministic function. Furthermore, the selection of a function from the set of functions may be based upon a function identifier that identifies the function as previously described. In other embodiments, the function may be selected based off of a list, an indicator, or based off of any other manner of selection known to the art. One of skill in the art will appreciate that the actual means for selecting the function is irrelevant to the present disclosure so long as the transmitter device and recipient device select the same function in the same order.

After selecting the function, flow proceeds to operation 408 wherein the method 300 provides for deriving a new control word using the function selected at operation 406. The derived control word may be generated using the retrieved data (e.g., the previous control word and/or the retrieved prior data transmission stream data) and the selected control function. In one embodiment, the selected function uses the previous control word retrieved at step 402 as an input to generate the derived control word. In another embodiment, the selected function may use the stored data from the prior data transmission stream retrieved at optional operation 404 as an input to derive a new control word. In yet another embodiment, the selected function may receive both the prior control word and the prior data transmission stream data as input to derive a control word. In still another embodiment, the function may use a combination of the previous control word and the prior data stream data as input to derive a control word at operation 408.

While FIG. 4 and the corresponding discussion have presented a description of various embodiments for deriving a control word, one of skill in the art will appreciate that other methods of generating a derived control word are envisioned within the scope of this disclosure. Embodiments of the method 400 described with respect to FIG. 4 may be performed by a head-end device and/or a recipient device. In other embodiments, the method 400 may be performed by a device other than a head-end device or recipient device such as, for example, a general computing device as described in FIG. 8. Additionally, in other embodiments, the steps of method 400 may be combined or performed in a different order without deviating from the spirit of the present disclosure.

Figure 5:
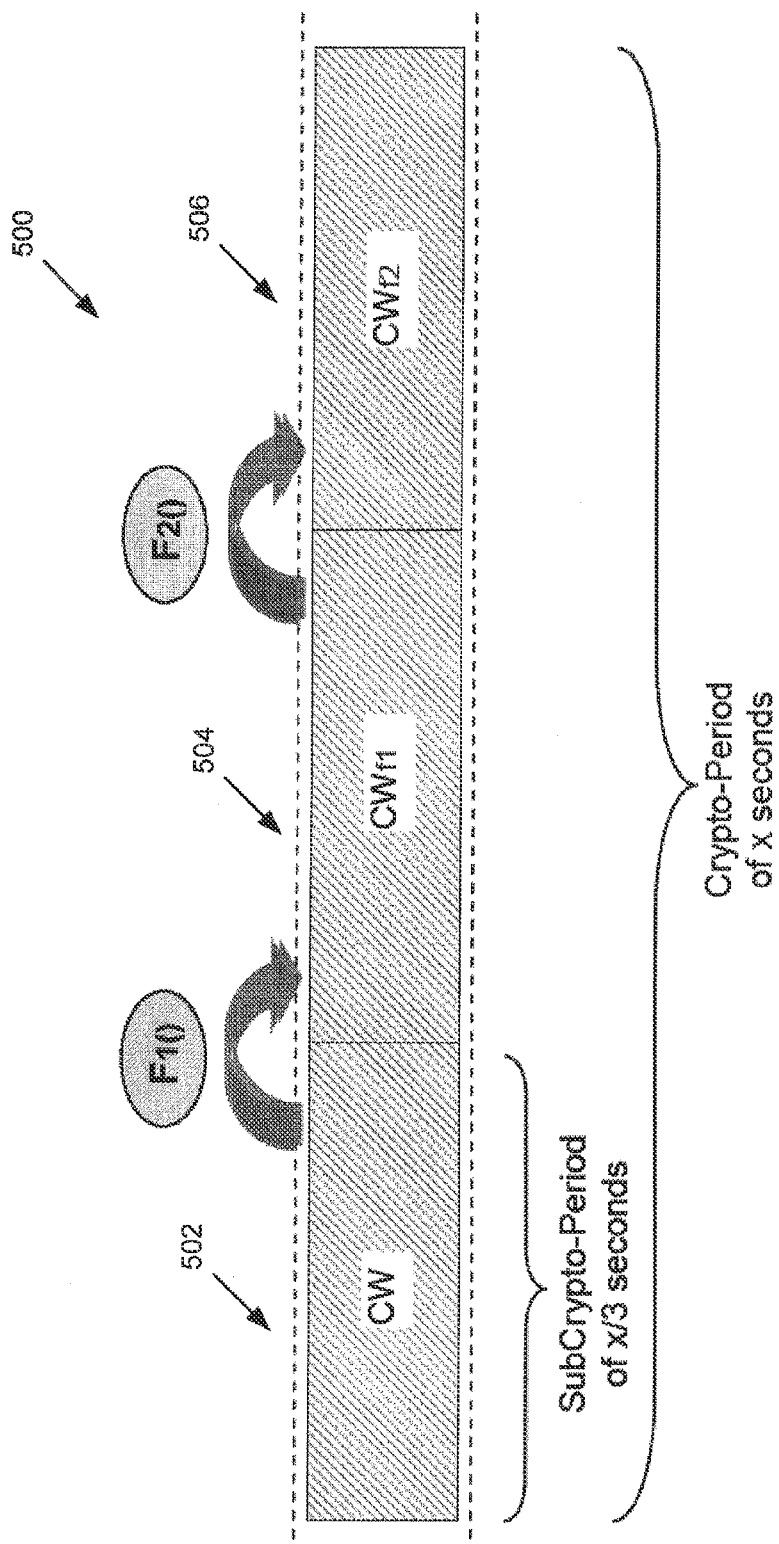
FIG. 5 is an illustration of an embodiment of a crypto period 500 divided into a series of cascading sub-crypto periods.

FIG. 5 is an illustration of an embodiment of a crypto period 500 divided into a series of cascading sub-crypto periods. The crypto period 500 represents the key used both for encryption and decryption of the content in a broadcasted data transmission stream. As illustrated in FIG. 5, the crypto period 500 is divided into 3 sub-crypto periods 502, 504, and 506. In this embodiment, each sub-crypto period lasts for a duration of a third of the time of the entire crypto period. Although FIG. 4 illustrates 3 sub-crypto periods, any number of sub-crypto periods may be used with the embodiments disclosed herein.

In one embodiment, during the first sub-crypto period 502 the original control word "CW" is used to encrypt and decrypt the broadcasted data transmission stream. At the end of the first sub-crypto period 502, "CW" is input into the function $F_1()$ to create $CW_{f1}$. $CW_{f1}$ is used to encrypt and decrypt the broadcast data transmission stream during the second sub-crypto period 504. For example, the creation of $CW_{f1}$ is the result of performing operations 214 and 314 in FIGS. 2 and 3 respectively. At the end of the second sub-crypto period 504, $CW_{f1}$ is input into the function $F_2()$ to produce $CW_{f2}$. $CW_{f2}$ is then used to encrypt and decrypt the broadcast data transmission stream. Because the example crypto period 500 only has three sub-crypto periods, at the end of the third sub-crypto period 506 a new control word is shared between the transmitting device and the recipient devices and the transitions between the sub-crypto periods 502, 504, and 506 are repeated for the new crypto period.

In embodiments, because the initial control word and the set of functions are shared between the transmitter (e.g., a head-end) and the recipient devices (e.g., a set-top-box, a television, a computer, a smartphone, etc.) an identical crypto period 500 transition will be reproduced on each of the devices without requiring continual communication of control words between the devices.

Figure 6:
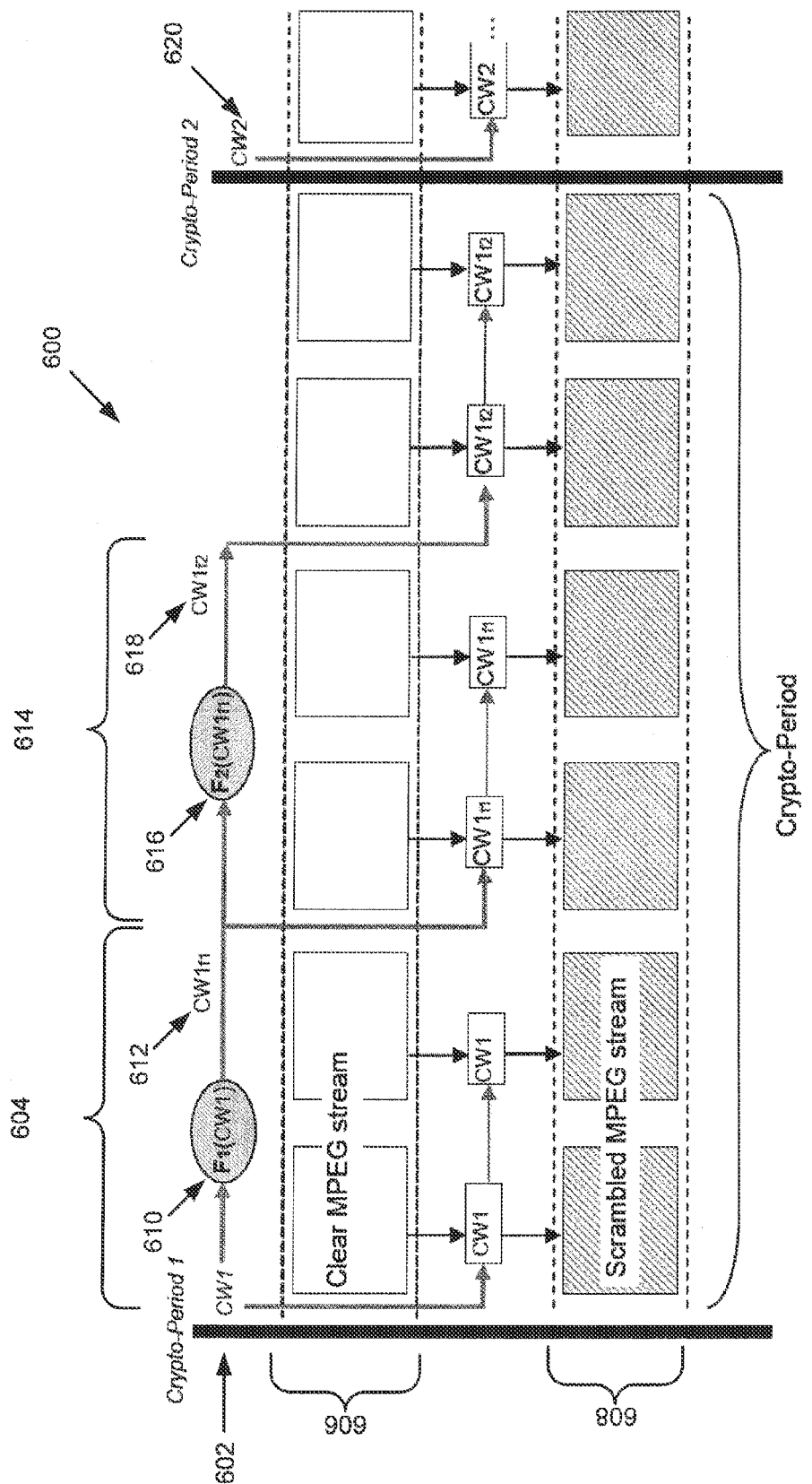
FIG. 6 is an illustration of an embodiment of a process 600 for performing cascading dynamic crypto periods at a head-end.

FIG. 6 is an illustration of an embodiment of a process 600 for performing cascading dynamic crypto periods at a head-end, such as head end 102 (FIG. 1). The process 600 illustrated in FIG. 6 corresponds to the method 200 described with respect to FIG. 3. An initial control word CW1 602 is generated or received by the head-end. The initial control word is used during the first sub-crypto period 604 to encrypt a clear data transmission stream 606 (e.g., the "Clear MPEG stream") to produce an encrypted data transmission stream 608 (e.g., the "Scrambled MPEG stream"). The Scrambled MPEG stream is then broadcast over a communication network. One of skill in the art will recognized that a scrambled data MPEG stream is an encrypted data transmission stream. The words "scrambled" and "encrypted" both relate to the protection of content by making it unusable and/or unreadable to users who are not authorized to access the content. The words "scrambled" and "encrypted" are used interchangeably throughout this disclosure. Eventually, the first-sub-crypto period terminates and the control word CW1 is input into a first function from the set of functions $F_1(CW1)$ 610 to generate a first derived control word $CW1_{f1}$ 612. The first derived control word $CW1_{f1}$ 612 is then used to encrypt the Clear MPEG stream during the second sub-crypto period 614 to generate the Scrambled MPEG stream 608. At the termination of the second sub-crypto period, the first derived control word $CW1_{f1}$ 612 is input into the next function in the set of functions $F_2(CW1_{f1})$ 616 in order to produce a new derived control word $CW1_{f2}$ 618. The new derived control word is then used encrypt the Clear MPEG Stream 606 in order to produce the Scrambled MPEG stream 608. At the end of the crypto period, a new control word CW2 620 (e.g., a second control word) is derived or received by the head-end and a new set of functions (e.g., a second set of functions) are used to repeat the cascading process for the second crypto period. One of skill in the art will appreciate that this process described herein may be repeated during the lifetime of the broadcast of the data transmission stream.

In embodiments illustrated by FIG. 6, the head-end is responsible for generating or initially receiving a random control word CW1 602. The random control word CW1 602 is used with DVB architecture to scramble the data transmission stream. Based upon configuration and pre-determined rules (e.g., the time or number of sub-crypto periods), the head-end applies CW1 602 to the set of functions to derivate other control words (e.g., $CW1_{f1}$ 612 and $CW1_{f2}$ 618). The head-end uses the sequence of control words to protect the data transmission stream.

Figure 7:
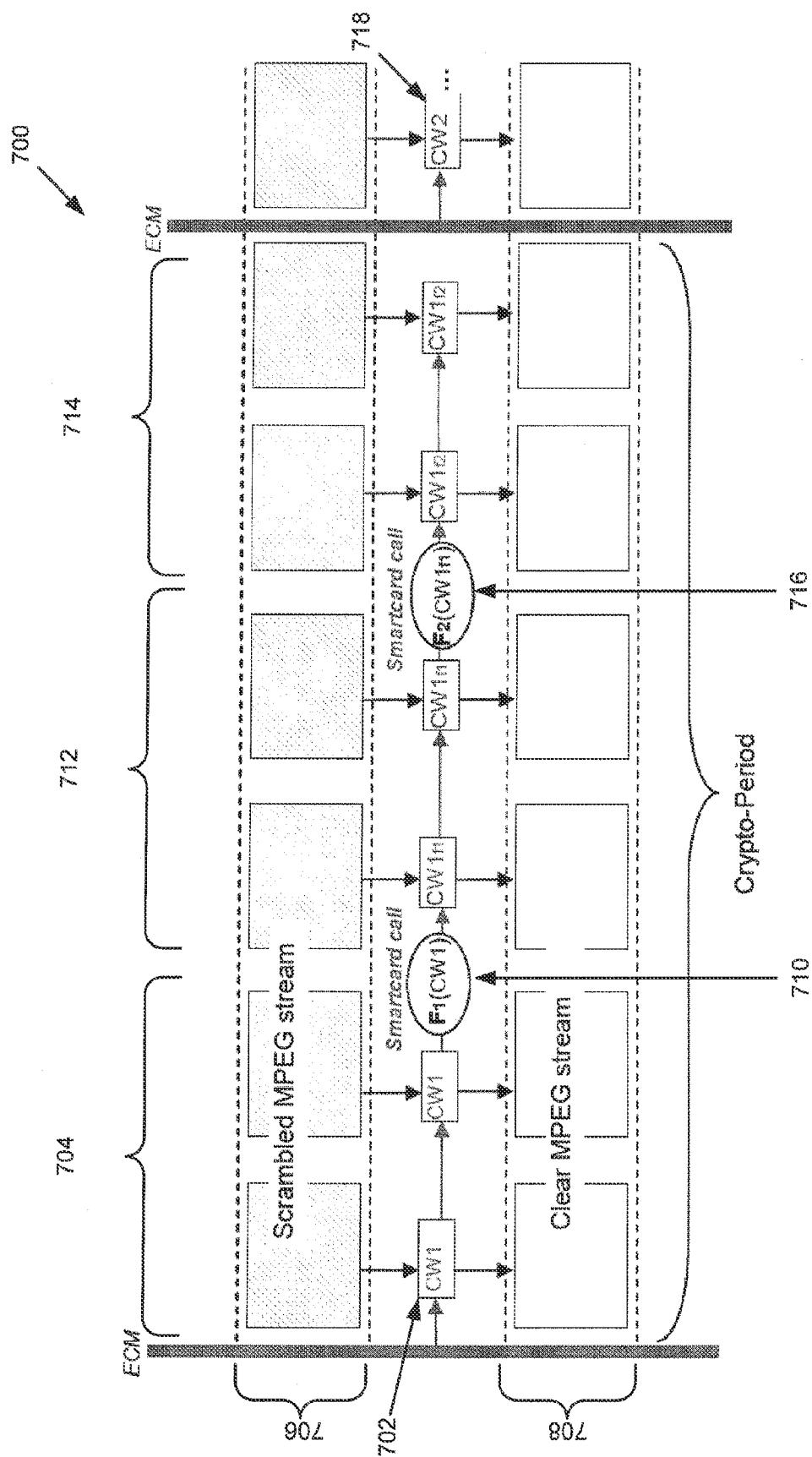
FIG. 7 is an illustration of an embodiment of a process 700 for performing cascading dynamic crypto periods at a recipient device.

FIG. 7 is an illustration an embodiment of a process 700 for performing cascading dynamic crypto periods at a recipient device. In embodiments, the process may be performed by a set-top-box, a smart card that is a part of a conditional access system, a television, a computer, a smartphone, or any other type of general computing device. In embodiments, the recipient device receives an initial control word CW1 602 and uses it during a first sub-crypto period 704 to decrypt an encrypted data transmission stream 706 (e.g., the "Scrambled MPEG stream") to produce a clear data transmission stream 708 (e.g., the "Clear MPEG stream"). The first-sub-crypto period 704 terminates and the control word CW1 702 is input into a first function from the set of functions $F_1(CW1)$ at point 710 to generate a first derived control word $CW1_{f1}$. The second derived control word $CW1_{f1}$ is then used to decrypt the Scrambled MPEG stream 706 to produce the Clear MPEG stream 608 during the second sub-crypto period 712. Upon the beginning of the third sub-crypto period 714, the first derived control word $CW1_{f1}$ is input into the next function in the set of functions $F_2(CW1_{f1})$ at point 716 in order to produce a new derived control word $CW1_{f2}$. In embodiments, the transition between sub-crypto periods may be based off of a timer or an indicator in the data transmission stream (e.g., a bit or a flag). Upon termination of the first crypto period, the recipient device receives a second control word CW2 718 and a second set of functions and the process is repeated for the second crypto period. One of skill in the art will appreciate that this process described herein may be repeated during the lifetime of the broadcast of the data transmission stream. In an embodiment in which the recipient device is a set-top-box with a conditional access system controlled by a smart card, the encryption and decryption of the content described with respect to FIG. 7 may be accomplished by the smart card. In such embodiments, the set-top-box may make calls to the smart card call at points 710 and 716 in order to generate the derived control words, decrypt the encrypted data transmission stream, and or perform any of the operations and/or steps illustrated in FIG. 7.

Although FIGS. 6 and 7 are described using a specific number of sub-crypto periods, one of skill in the art will appreciate that the processes described can be repeated and extended for any number of crypto and/or sub-crypto periods. While embodiments of FIGS. 5 and 6 have been described as deriving control words at a set time, one of skill in the art will appreciate that the derived control words may be produced at any time period during the crypto period. For example, in one embodiment, all of the derived control words may be generated at the start of the crypto period, before the start of a new crypto period, or at any other time so long as the derived key word is produced in time to make the transition between sub-crypto periods.

Figure 8:
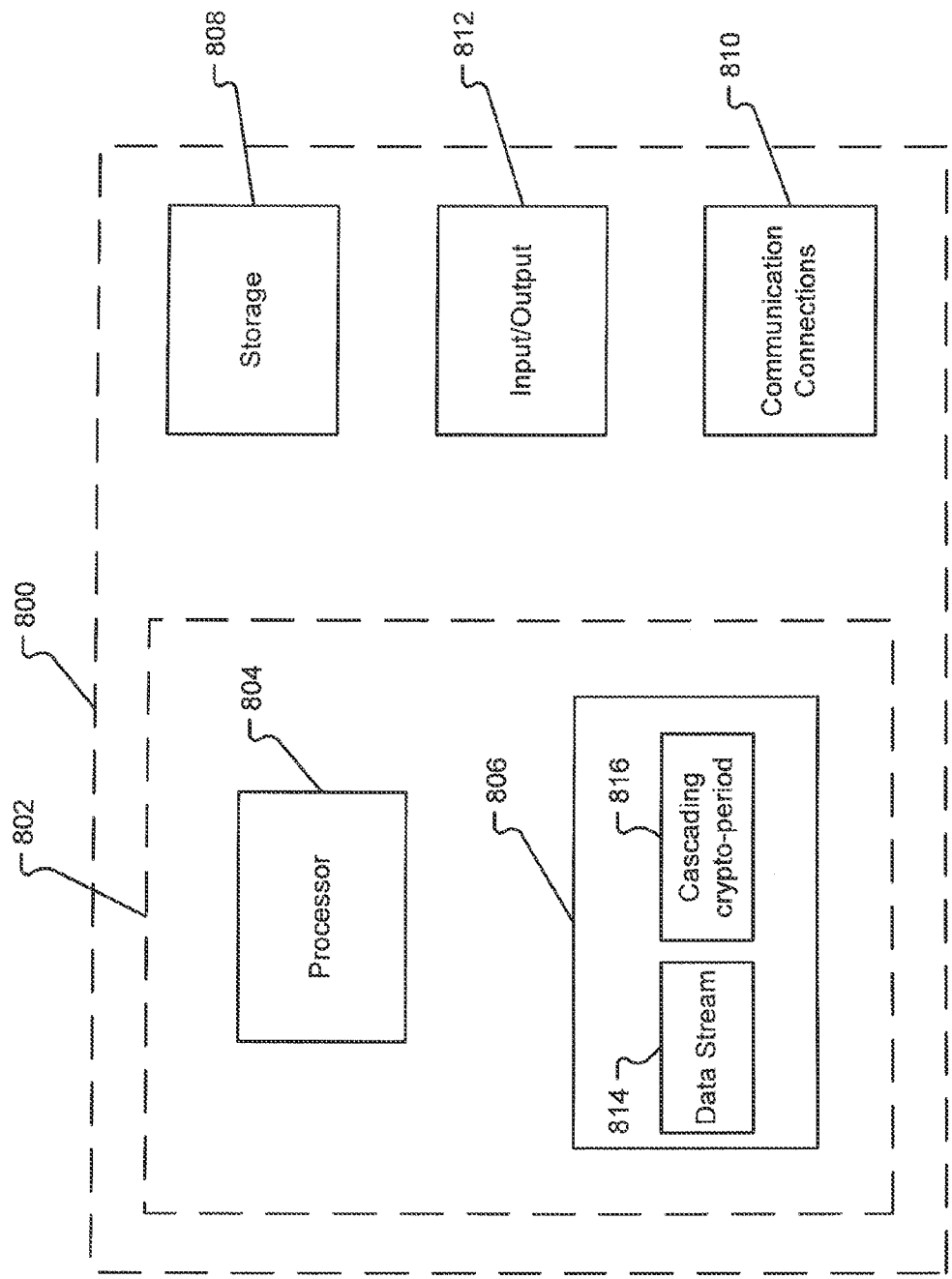
FIG. 8 illustrates an embodiment of a computer environment and computer system 800 for implementing cascading dynamic crypto periods.

With reference to FIG. 8, an embodiment of a computing environment for implementing the various embodiments described herein includes a computer system, such as computer system 800. Any and all components of the described embodiments (such as the DVR, the content storage sever, a laptop, mobile device, personal computer, etc.) may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 800 comprises at least one processing unit or processor 804 and system memory 806. The most basic configuration of the computer system 800 is illustrated in FIG. 8 by dashed line 802. In some embodiments, one or more components of the described system are loaded into system memory 806 and executed by the processing unit 804 from system memory 806. Depending on the exact configuration and type of computer system 800, system memory 806 may be volatile (such as RAM), non-volatile (such as ROM, flash memory, etc.), or some combination of the two.

Additionally, computer system 800 may also have additional features/functionality. For example, computer system 800 may include additional storage media 808, such as removable and/or non-removable storage, including, but not limited to, magnetic or optical disks or tape. In some embodiments, software or executable code and any data used for the described system is permanently stored in storage media 808. Storage media 808 includes volatile and non-volatile, removable and non-removable media implemented in any method or technology for storage of information such as computer readable instructions, data structures, program modules, or other data.

System memory 806 and storage media 808 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by computer system 800 and processor 804. Any such computer storage media may be part of computer system 800. In some embodiments, system memory 806 and/or storage media 808 may store data used to perform the methods or form the system(s) disclosed herein, such as the content and the metadata described herein. In other embodiments, system memory 806 may store information such as the data transmission stream 814 and logic 816 to perform the methods of cascading dynamic crypto periods disclosed herein.

Computer system 800 may also contain communications connection(s) 810 that allow the device to communicate with other devices. Communication connection(s) 810 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, content and metadata may be transmitted over communications connection(s) 810.

In some embodiments, computer system 800 also includes input and output connections 812, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 812 are used to display the information as described herein. All these devices are well known in the art and need not be discussed at length here.

In some embodiments, the component described herein comprise such modules or instructions executable by computer system 800 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 800 is part of a network that stores data in remote storage media for use by the computer system 800.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the invention is not limited to those specific embodiments. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A computer-implemented method for encrypting a data transmission stream using cascading dynamic crypto periods, the method comprising:
sending a first set of functions to a recipient device for use during a first crypto period, the first crypto period comprising a number of sub-crypto periods correlated to a number of functions included in the first set of functions, wherein the plurality of sub-crypto periods comprises at least a first sub-crypto period and a second sub-crypto period, and wherein the first sub-crypto period is a discrete portion of the first crypto period and the second sub-crypto period is a second discrete portion of the first crypto period;
sending a first control word to the recipient device;
encrypting the first sub-crypto period of the data transmission stream using the first control word;
sending the first sub-crypto period of the encrypted data transmission stream to the recipient device;
generating a first derived control word, wherein the first derived control word is generated by applying a first function from the first set of functions to retrieved data;
encrypting the second sub-crypto period of the data transmission stream using the first derived control word; and
sending the second sub-crypto period of the encrypted data transmission stream to the recipient device.

2. The method of claim 1, wherein the retrieved data is the first control word.

3. The method of claim 1, wherein the retrieved data is prior data transmission stream data.

4. The method of claim 1, wherein the retrieved data resides in at least one of:
local memory; and
local storage.

5. The method of claim 1, wherein the first set of functions is sent to the recipient device in an Entitlement Management Message (EMM).

6. The method of claim 1, wherein the first control word is sent to the recipient device in an Entitlement Control Message (ECM).

7. The method of claim 1, wherein the data transmission is an MPEG stream.

8. The method of claim 1, wherein the recipient device is a set-top-box.

9. The method of claim 8, wherein the set-top-box comprises a smart card.

10. The method of claim 1, further comprising, determining when a transition from the first sub-crypto period to the second sub-crypto period occurs.

11. The method of claim 10, wherein the transition from the first sub-crypto period to the second sub-crypto period is based upon predetermined timing.

12. The method of claim 10, wherein the transition from the first sub-crypto period to the second sub-crypto period is triggered based upon a signal in the data transmission stream.

13. The method of claim 12, wherein the signal is a flag in the data transmission stream.

14. The method of claim 12, wherein the signal is a function identifier in the data transmission stream.

15. The method of claim 14, wherein the first function is identified by the function identifier.

16. The method of claim 1, wherein the first set of functions comprises deterministic functions.

17. The method of claim 1, wherein the first set of functions are predetermined and loaded at a head-end.

18. The method of claim 1, wherein the first set of functions is dynamically derived at a head-end using a root function.

19. The method of claim 1, wherein the first control word is a randomly generated number.

20. The method of claim 1, further comprising:
sending a second set of functions to the recipient device for use during a second crypto period; and
sending a second control word to the recipient device.

21. A computer-implemented method for decrypting an encrypted data transmission stream using cascading dynamic crypto periods, the method comprising:
receiving, at a recipient device, a first set of functions comprising a plurality of functions, wherein the plurality of functions is correlated to a number of sub-crypto periods;
receiving, at the recipient device, a first control word;
receiving, at the recipient device, a first portion of an encrypted data transmission, wherein the first portion of the encrypted data transmission stream is encrypted using the first control word and represents a first sub-crypto period of the encrypted data transmission stream, wherein the first sub-crypto period is a discrete portion of a crypto period;
generating a first portion of a clear data stream by decrypting the first portion of the encrypted data transmission stream using the first control word;
receiving, at the recipient device, a second portion of the encrypted data transmission stream, wherein the second portion of the encrypted data transmission stream is encrypted using a first derived control word and represents a second sub-crypto period of the encrypted data transmission stream, wherein the second sub-crypto period is a discrete portion of the crypto period;
generating the first derived control word by applying a first function from the first set of functions to retrieved data; and
generating a second portion of the clear data stream by decrypting the second portion of the encrypted data transmission stream using the first derived control word.

22. The method of claim 21, further comprising, sending the first and second portions of the clear data stream to a display device.

23. The method of claim 21, further comprising, storing the first and second portions of the clear data stream.

24. The method of claim 21, wherein the encrypted data transmission stream is an encrypted MPEG stream.

25. The method of claim 21, wherein the clear data stream is an MPEG stream.

26. The method of claim 21, wherein the first set of functions is received in an Entitlement Control Message (ECM).

27. The method of claim 21, wherein first control word is received in an Entitlement Control Message.

28. The method of claim 21, further comprising determining when a transition from the first sub-crypto period to the second sub-crypto period occurs.

29. The method of claim 28 wherein the transition from the first sub-crypto period to the second sub-crypto period is based upon a predetermined timing.

30. The method of claim 28, wherein the transition from the first sub-crypto period to the second sub-crypto period is triggered based upon a signal in the encrypted data transmission stream.

31. The method of claim 30, wherein the signal is a flag in the encrypted data transmission stream.

32. The method of claim 21, wherein the first set of functions comprises deterministic functions.

33. The method of claim 21, wherein the recipient device is a set-top-box.

34. The method of claim 21, wherein the recipient device is a mobile device.

35. The method of claim 21, wherein the recipient device is a television.

36. The method of claim 21, wherein the first derived control word is generated before receiving the second portion of the encrypted data transmission stream.

37. The method of claim 21, wherein the retrieved data is the first control word.

38. The method of claim 21, wherein the retrieved data is prior data transmission stream data.

39. The method of claim 21, wherein the retrieved data resides in at least one of:
local memory; and
local storage.

40. A system for encrypting and decrypting a data transmission stream using cascading dynamic crypto periods, the system comprising:
a head-end device for receiving and encrypting a clear data transmission stream, the head-end comprising device:
at least a first processor; and
a first memory in communication with and readable by at least the first processor, wherein the first memory comprises instructions that, when executed by at least the first processor, cause the at least one processor to perform a first method comprising:
sending a first set of functions to a recipient device for use during a first crypto period, the first crypto period comprising a number of sub-crypto periods correlating to a number of functions in the first set of functions, wherein the number of sub-crypto periods comprises at least a first sub-crypto period and a second sub-crypto period, and wherein the first sub-crypto period is a first discrete portion of the first crypto period and the second sub-crypto period is a second discrete portion of the first crypto period;
sending a first control word to the recipient device;
encrypting the first sub-crypto period of the data transmission stream using the first control word;
sending the first sub-crypto period of the encrypted data transmission stream to the recipient device;
generating a first derived control word, wherein the first derived control word is generated by applying a first function from the first set of functions to the first control word;
encrypting the second sub-crypto period of the data transmission stream using the first derived control word; and
sending the second sub-crypto period of the encrypted data transmission stream to the recipient device.

41. The system of claim 40, further comprising, determining when a transition from the first sub-crypto period to the second sub-crypto period occurs.

42. The system of claim 41, wherein the transition from the first sub-crypto period to the second sub-crypto period is based upon predetermined timing.

43. The system of claim 41, wherein the transition from the first sub-crypto period to the second sub-crypto period is triggered based upon a signal in the data transmission stream.

44. The system of claim 43, wherein the signal is a flag in the data transmission stream.

45. The system of claim 43, wherein the signal is a function identifier in the data transmission stream.

46. The system of claim 43, wherein the first set of functions comprises at least one deterministic function.

47. The system of claim 43, wherein the first set of functions are predetermined and loaded at the head-end.

48. The system of claim 43, wherein the first set of functions is dynamically derived at the head-end device using a root function.

49. The system of claim 40, further comprising:
the recipient device for receiving and decrypting the encrypted data transmission stream, the recipient device comprising:
at least a second processor; and
a second memory in communication with and readable by the at least the second processor, wherein the second memory comprises instructions that, when executed by at least the second processor, cause at least the second processor to perform a second method, the second method comprising:
receiving the first set of functions;
receiving the first control word;
receiving the first sub-crypto period of the encrypted data transmission stream;
generating a first portion of a clear data stream by decrypting the first sub-crypto period of the encrypted data transmission stream using the first control word;
receiving the second sub-crypto period of the encrypted data transmission stream;
generating the first derived control word by applying the first function from the first set of functions to the first control word; and
generating a second portion of the clear data stream by decrypting the second sub-crypto period of the encrypted data transmission stream using the first derived control word.

50. The system of claim 49, wherein the recipient device is a set-top-box.

51. The system of claim 50, wherein the at least second processor is located on a smart card that is a part of the set-top-box.

52. The system of claim 49, wherein the recipient device is a mobile device.

53. The system of claim 49, wherein the second memory further comprises instructions that, when executed by the processor, cause the processor to perform:
sending the clear data stream to a display device.

54. The system of claim 49, wherein the second memory further comprises instructions that, when executed by the processor, cause the processor to perform:
storing the clear data stream.

55. A recipient device for receiving and decrypting an encrypted data stream, the recipient device comprising:
a processor; and
a memory in communication with and readable by the processor, wherein the memory comprises instructions that, when executed by the processor, cause the processor to perform a method, the method comprising:
receiving a first set of functions comprising a plurality of functions, wherein a number of sub-crypto periods correlates to a number of functions included in the plurality of functions;
receiving a first control word;
receiving a first portion of an encrypted data transmission, wherein the first portion of the encrypted data transmission stream is encrypted using the first control word and represents a first sub-crypto period of the encrypted data transmission stream, wherein the first sub-crypto period is a discrete portion of a crypto period;
generating a first portion of a clear data stream by decrypting the first portion of the encrypted data transmission stream using the first control word;
receiving a second portion of the encrypted data transmission stream, wherein the second portion of the encrypted data transmission stream is encrypted using a first derived control word and represents a second sub-crypto period of the encrypted data transmission stream, wherein the second sub-crypto period is a discrete portion of the crypto period;

generating the first derived control word by applying a first function from the first set of functions to the first control word; and generating a second portion of the clear data stream by decrypting the second portion of the encrypted data transmission stream using the first derived control word.

56. The recipient device of claim 55, wherein the recipient device is a set-top-box.

57. The recipient device of claim 56, wherein the processor is located on a smart card that is part of the set-top-box.

58. The recipient device of claim 55, wherein the recipient device is a mobile device.

59. The recipient device of claim 55, wherein the first portion of the encrypted data stream corresponds to the first sub-crypto period.

60. The recipient device of claim 55, wherein the second portion of the encrypted data stream corresponds to the second sub-crypto period.

61. The recipient device of claim 55, wherein the memory further comprises instructions that, when executed by the processor, cause the processor to perform:

sending the clear data stream to a display device.

62. The recipient device of claim 55, wherein the memory further comprises instructions that, when executed by the processor, cause the processor to perform:

rendering the clear data stream; and displaying the clear data stream to a user.

63. The recipient device of claim 55, wherein the memory further comprises instructions that, when executed by the processor, cause the processor to perform:

storing the clear data stream.

64. The recipient device of claim 55, wherein the first set of functions comprises one or more deterministic functions.

65. The recipient device of claim 55, wherein the clear data stream is a MPEG stream.

66. The recipient device of claim 55, wherein the recipient device is a television.

* * * * *